United States Patent
Pinschmidt et al.

(10) Patent No.: US 11,065,955 B2
(45) Date of Patent: Jul. 20, 2021

(54) DRIVE DEVICE FOR A VEHICLE AXLE OF A TWO-TRACK VEHICLE

(71) Applicant: AUDI AG, Ingolstadt (DE)

(72) Inventors: Udo Pinschmidt, Gaimersheim (DE);
Steffen Hummel, Bergen (DE);
Christian Wirth, Moosinning/Eichenried (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/650,108

(22) PCT Filed: Oct. 18, 2018

(86) PCT No.: PCT/EP2018/078614
§ 371 (c)(1),
(2) Date: Mar. 24, 2020

(87) PCT Pub. No.: WO2019/091746
PCT Pub. Date: May 16, 2019

(65) Prior Publication Data
US 2020/0247237 A1  Aug. 6, 2020

(30) Foreign Application Priority Data

Nov. 13, 2017 (DE) .................... 10 2017 220 167.3

(51) Int. Cl.
*B60K 17/348* (2006.01)
*B60K 17/04* (2006.01)

(52) U.S. Cl.
CPC .......... *B60K 17/046* (2013.01); *B60K 17/348* (2013.01)

(58) Field of Classification Search
CPC ...... B60K 17/046; B60K 17/348; B60K 6/48; B60K 6/52; B60K 2001/001; B60K 1/00;
(Continued)

(56) References Cited

U.S. PATENT DOCUMENTS 10,596,895 B2 * 3/2020 Morio .................. B60K 7/0007
10,767,743 B2 * 9/2020 Kockisch ................ F16H 48/38
(Continued)

FOREIGN PATENT DOCUMENTS

DE   102009049856 A1   4/2011
DE   102010036239 A1   3/2012
(Continued)

OTHER PUBLICATIONS

Examination Report dated Jul. 31, 2018 in corresponding German application No. 10 2017 220 167.3; 10 pages including Machine-generated English-language translation.
(Continued)

*Primary Examiner* — Justin Holmes
(74) *Attorney, Agent, or Firm* — Maier & Maier, PLLC

(57) ABSTRACT

A drive device for a vehicle axle, especially a rear axle, of a two-track vehicle, wherein the vehicle axle includes an axle differential, which can be connected at the input end to a primary drive machine and can be connected at the output end across flange shafts arranged on either side to vehicle wheels of the vehicle axle, wherein the vehicle axle is associated with an additional drive machine and a shiftable superimposing gear, which can be shifted to a torque distribution gear in which a drive torque is generated by the additional drive machine.

20 Claims, 4 Drawing Sheets

(58) Field of Classification Search
CPC .... Y02T 10/62; F16H 48/11; F16H 2048/106; F16H 2048/364; F16H 2048/368; B60Y 2400/73; B60Y 2300/82; B60Y 2200/92; B60Y 2400/732
See application file for complete search history.

(56) References Cited

U.S. PATENT DOCUMENTS

2015/0176687 A1* 6/2015 Smetana .............. B60K 1/00 475/5
2016/0003337 A1* 1/2016 Smetana .............. F16H 48/05 475/5

FOREIGN PATENT DOCUMENTS

| DE | 102012013375 A1 | 1/2014 |
|----|-----------------|--------|
| DE | 102013202381 A1 | 8/2014 |
| DE | 102013019906 A1 | 5/2015 |
| DE | 102013019907 A1 | 5/2015 |
| DE | 102014007940 A1 | 11/2015 |
| DE | 102014210549 A1 | 12/2015 |
| DE | 102014015793 A1 | 4/2016 |
| DE | 102015104778 A1 | 9/2016 |

OTHER PUBLICATIONS

International Search Report dated Jan. 22, 2019 and Written Opinion in corresponding application No. PCT/EP2018/078614; 20 pages.
International Preliminary Report on Patentability and the Written Opinion of the International Searching Authority dated May 19, 2020, in connection with corresponding international Application No. PCT/EP2018/078614 (10 pgs.).

* cited by examiner

US 11,065,955 B2

DRIVE DEVICE FOR A VEHICLE AXLE OF A TWO-TRACK VEHICLE

FIELD

The disclosure relates to a drive device for a vehicle axle, especially a rear axle, of a two-track vehicle.

BACKGROUND

From DE 10 2014 015 793 A1 there is known a drive device of this kind for a vehicle rear axle comprising an axle differential, which can be connected at the input end to a primary drive machine (such as an internal combustion engine) and can be connected at the output end to flange shafts arranged on either side with vehicle wheels of the vehicle axle. The vehicle axle is associated with an additional drive machine (especially an electric motor) and a shiftable superimposing gear. The superimposing gear can be shifted to a torque distribution gear in which a drive torque can be generated by the additional drive machine, depending on the magnitude and direction of rotation of which a torque distribution on the two vehicle wheels can be changed. Alternatively, the superimposing gear can be shifted to a hybrid mode in which the drive torque generated by the additional drive machine can be coupled to both flange shafts of the vehicle wheels, evenly distributed across the axle differential. In certain driving situations, for example when negotiating a curve, the driving performance when the torque distributions gear is engaged can be assisted by a torque redistribution (torque vectoring or cross lock function). Thus, when negotiating a curve, a drive torque when entering the curve can be shifted to the outer wheel of the vehicle on the curve (torque vectoring). Alternatively or additionally, when negotiating a curve, the drive torque when exiting the curve can be shifted to the inner wheel of the vehicle on the curve (cross lock function). On the other hand, a boost function can occur, for example, when hybrid mode is activated.

In the cited DE 10 2014 015 793 A1, the superimposing gear comprises a total of three planetary gearing, which can be shifted by means of two brakes in order to provide the hybrid mode or the torque distribution mode, resulting in a design space-intensive arrangement on the whole.

SUMMARY

The problem which the invention proposes to solve is to provide a drive device for a vehicle axle of a two-track vehicle having reduced design space as compared to the prior art, and enabling a function expansion/reduction with simple means, namely, with less design space requirement and with enhanced driving dynamics.

According to the disclosure, the three planetary gearing in the superimposing gear are coupled together such that a load path is formed when a first hybrid gear H1 is engaged, especially a starting gear, or when a first hybrid gear is engaged, in which a power branching occurs and all three planetary gearing are incorporated. Either when a second hybrid gear H2 is engaged or when the torque distribution gear TV is engaged, a load path is formed in which the same two planetary gearing PG1, PG2 are integrated. In this way, different gear ratios can be easily realized in the first hybrid gear and in the second hybrid gear.

Of the three planetary gearings, an input planetary gearing is connected in driving manner at the input end to the additional drive machine. An output planetary gearing is connected in driving manner at the output end to the axle differential, while an intermediate planetary gearing is incorporated between them in the axial direction. The three planetary gearings can preferably be arranged in succession in the vehicle transverse direction, coaxially to the flange shaft.

In one specific embodiment, the input planetary gearing can be rotationally fixed by its sun gear (acting as the input element) on a gearing input shaft which is driven by the additional drive machine. Accordingly, the output planetary gearing may have a planet carrier, carrying planet gears and serving as the output element. This can be rotationally fixed by a hybrid output flange to a gearing output shaft of the superimposing gear. The gearing output shaft is connected in driving manner to the axle differential input end.

The sun gear of the input planetary gearing (acting as the input element) meshes with planet gears, which are rotatably mounted on a planet carrier and are in tooth engagement with a ring gear. The ring gear of the input planetary gearing and a ring gear of the intermediate planetary gearing can be rotationally fixed on a radially outward ring gear shaft. The ring gear of the intermediate planetary gearing meshes with planet gears which are rotatably mounted on a planet carrier and which are in tooth engagement with a sun gear, fixed on the housing.

The planet carrier of the input planetary gearing may furthermore be locked by a hybrid shift element SH2 to the gearbox housing or be released from it. Accordingly, the planet carrier of the intermediate planetary gearing can be rotationally fixed on the planet carrier of the output planetary gearing or on the gearing output shaft. The planet carrier of the intermediate planetary gearing and the output planetary gearing can preferably be connected in driving manner to each other by a connecting shaft.

In the above gearing structure, with second hybrid gear engaged, the planet carrier of the input planetary gearing can thus be connected by means of the hybrid shift element firmly to the housing. In this case, a load path results from the additional drive machine across the input planetary gearing to the intermediate planetary gearing. From here, the load path proceeds across the gearing output shaft to the input end of the axle differential, namely, without power branching and with free turning output planetary gearing, that is, not being incorporated in the load path.

The axle differential may be realized in any desired design, for example, as a Ravigneaux set, in which planet gears of a first planet gear set mesh with both a radially outer ring gear, forming the input end of the axle differential, and with planet gears of a second planet gear set. Furthermore, the planet gears of the first planet gear set are in tooth engagement with a first, major sun gear, while the planet gears of the second planet gear set are in tooth engagement with a second, minor sun gear. The two planet gear sets are ordinarily rotatably mounted on a common planet carrier. Preferably, the first, major sun gear can be rotationally fixed on a torque distribution output shaft, while the second, minor sun gear is rotationally fixed on the one flange shaft (away from the gearing) and the common planet carrier is rotationally fixed on the other flange shaft (at the gearing side).

The aforementioned torque distribution shaft may carry a rotationally fixed torque distribution output flange, by which a torque distribution shift element STV can be coupled in driving manner to the planet carrier of the input planetary gearing or be released from it.

Thus, when the torque distribution gear TV is engaged, the torque distribution shaft and the planet carrier of the input planetary gearing are joined together in driving manner by means of the torque distribution shift element STV. This produces a load path from the additional drive machine to the input planetary gearing, on whose planet carrier a power distribution occurs, during which a first partial path goes across the ring gear of the input planetary gearing and across the ring gear shaft to the intermediate planetary gearing. From here, the first partial path proceeds across the planet carrier to the gearing output shaft. The output planetary gearing, by contrast with the input and intermediate planetary gearing, is not incorporated in the first partial path, but instead turns freely. Furthermore, a second partial path goes across the planet carrier of the input planetary gearing and across the engaged torque distribution shift element STV to the torque distribution shaft and to the first, major sun gear of the axle differential. In this way, a torque distribution between the vehicle wheels will occur according to the magnitude and the rotary direction of the drive torque generated by the additional drive machine.

The output planetary gearing may comprise a sun gear, which meshes with planet gears and can be coupled by a hybrid shift element SH1 to the planet carrier of the input planetary gearing or be released from it. Furthermore, the output planetary gearing may comprise a ring gear, fixed to the housing and meshing with the planet gears.

When the first hybrid gear H1 is engaged, the sun gear of the output planetary gearing is coupled in driving manner to the planet carrier of the input planetary gearing. This forms a load path from the additional drive machine to the input planetary gearing, on whose planet carrier a power branching occurs into a first partial path and a second partial path. The first partial path goes across the planet gears and the ring gear of the input planetary gearing to the ring gear shaft and then to the intermediate planetary gearing. From here, the first partial path goes across the connecting shaft to the planet carrier of the output planetary gearing and to the gearing output shaft. The second partial path goes from the planet carrier of the input planetary gearing across the engaged hybrid shift element SH1 to the sun gear of the output planetary gearing. A power addition occurs on its planet carrier, during which the first and second partial paths are combined and the combined load path is taken further to the axle differential input end.

In regard to a package optimization, it is preferable for the planet carrier of the input planetary gearing to be connected to a shifting shaft, which bounds off a radially inward design space, in which the input and the intermediate planetary gearing are arranged in a favorable space layout. The shifting shaft comprises, at its shaft end situated axially away from the input planet carrier, the first hybrid shift element SH1, the second hybrid shift element SH2 and the torque distribution shift element STV. In this case, all of the shift elements SH1, SH2, STV can be assembled to form a shifting group, being positioned in the axial direction to the side of the planetary gearing. The shifting shaft, furthermore, can carry a rotationally fixed braking flange, which can be locked by the second hybrid shift element SH2 on the gearbox housing or released from it.

In regard to a further package optimization, it is preferable for the output planetary gearing to be situated vehicle-inward in the vehicle transverse direction and immediately next to the axle differential. The intermediate planetary gearing can be situated vehicle-outward, while the shift elements SH1, SH2, STV are positioned preferably on the vehicle-outward side of the intermediate planetary gearing. In this case, the sun gear of the output planetary gearing can be rotationally fixed to a sun gear shaft, whose shaft end away from the sun gear can be coupled by the first hybrid shift element SH1 to the above defined shifting shaft.

BRIEF DESCRIPTION OF THE DRAWING

An exemplary embodiment of the invention is described below with the aid of the enclosed figures.

There are shown.

DETAILED DESCRIPTION

Figure 1:
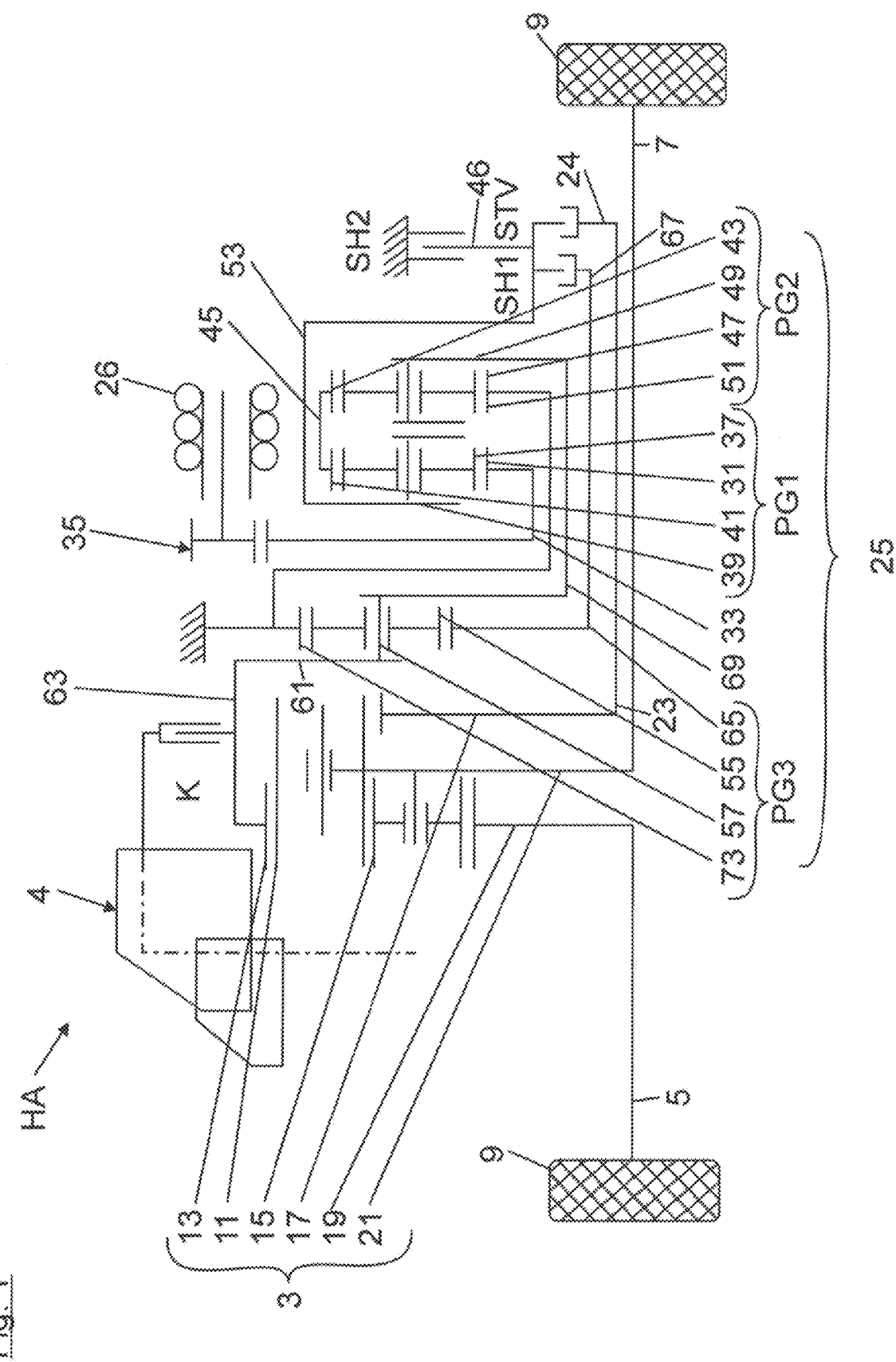
FIG. 1 in a schematic representation, a drive device for a vehicle rear axle of a two-track vehicle.

FIG. 1 shows, roughly schematically, a gearing structure of a drive device for a vehicle rear axle HA of a two-track vehicle. The drive device shown in FIG. 1 may be part of an all-wheel drive, in which a front-end internal combustion engine (not shown) as the primary drive machine drives the front wheels of the vehicle across a transmission as well as a central differential and a front axle differential. The central differential can be connected in driving manner across a Cardan shaft and across a bevel gear 4 to the input end 13 of a rear axle differential 3. Between the bevel gear 4 and the input end 13 of the rear axle differential 3 there is connected a clutch K, by which the rear axle HA can be decoupled from the drive of the Cardan shaft.

The rear axle differential 3 is coupled at its output, in driving manner, to the rear wheels 9 of the vehicle's rear axle HA across flange shafts 5, 7 arranged on both sides. In FIG. 1, the rear axle differential 3 is a planetary differential with a Ravigneaux gear set, in which planet gears 11 of a first planet gear set mesh with both a radially outer ring gear 13, forming the input end of the axle differential 3, and also with planet gears 15 of a second planet gear set. Furthermore, the planet gears 11 of the first planet gear set are in toothed engagement with a first, major sun gear 17. The planet gears 15 of the second planet gear set, on the other hand, are in toothed engagement with a second, minor sun gear 19. Both planet gear sets are rotatably mounted on a common planet carrier 21, which is rotationally fixed on a flange shaft away from the gearing. On the other hand, the second, minor sun gear 19 is rotationally fixed on the flange shaft 7 at the gearing side, while the first, major sun gear is rotationally fixed on a torque distribution output shaft 23, leading to the superimposing gear 25.

The rear axle HA comprises an already mentioned superimposing gear 25 as well as an electric machine 26. The superimposing gear 25 can be operated in a hybrid mode or in a torque distribution mode (that is, electronic torque vectoring or cross lock function), as will be described later on. In the hybrid mode, a drive torque generated by the electric machine 26 is coupled, evenly distributed across the superimposing gear 25 and the rear axle differential 3, to both flange shafts 5, 7. The hybrid mode can be implemented as a pure electric motor or in combination of the electric machine 26 with the internal combustion engine (for example for a boost function).

In the torque distribution mode, the drive torque generated by the electric machine 26 is taken not only to the input end (ring gear 13) of the axle differential 3, but also across the superimposing gear 25 to the first, major sun gear 17 of the axle differential 3, in order to change a torque distribution on the two rear wheels 9. The channeling to the first, major sun gear 17 occurs across a torque distribution flange 24 of the superimposing gear 25, mounted on the torque distribution output shaft 23. The torque distribution between the vehicle wheels 9 will occur according to the magnitude and the rotary direction of the drive torque generated by the electric machine 26.

In the following, the gearing structure of the superimposing gear 25 will be explained with the aid of FIG. 1: accordingly, the superimposing gear 25 comprises an input planetary gearing PG1 coupled in driving manner to the electric machine 26, an output planetary gearing PG3 connected in driving manner to the axle differential 3, and an intermediate planetary gearing PG2 connected between them. The three planetary gearings PG1, PG2, PG3 are arranged in succession, coaxially to the flange shaft 7. The output planetary gearing PG3 is positioned vehicle-inward in the vehicle transverse direction y and immediately next to the axle differential 3, while the intermediate planetary gearing PG2 is situated vehicle-outward. The shift elements SH1, SH2, STV to be described later on are positioned on the vehicle-outward side of the intermediate planetary gearing PG2 and assembled to form a shifting group.

The input planetary gearing PG1 has as its input element a sun gear 31, which is rotationally fixed to a gearing input shaft 33 driven by the electric machine 26.

In regard to a torque transformation, the electric machine 26 in FIG. 1 is coupled by a reduction stage 35 (that is, a spur gear stage) to the gearing input shaft 33. The electric machine 26 is thus situated axially parallel to the flange shaft 7 in regard to a package optimization.

The sun gear 31 of the input planetary gearing PG1 meshes with planet gears 37, which are rotatably mounted on a planet carrier 39. Moreover, the and planet gears are in tooth engagement with a ring gear 41. The ring gear 41 together with a ring gear 43 of the intermediate planetary gearing PG2 is rotationally fixed on a ring gear shaft 45. The ring gear 43 of the intermediate planetary gearing PG2 meshes with planet gears 47 which are rotatably mounted on a planet carrier 49 and which are in tooth engagement with a sun gear 51, fixed on the housing.

The planet carrier 39 of the input planetary gearing PG1 is connected to a radially outward shifting shaft 53, which bounds off a radially inward design space, in which both the input and the intermediate planetary gearing PG1, PG2 are arranged. At a shaft end of the shifting shaft 53 situated axially away from the input planet carrier there are positioned a first hybrid shift element SH1, a second hybrid shift element SH2 and a torque distribution shift element STV.

The output-end planetary gearing PG3 has as its output element a planet carrier 57, carrying planet gears 55, which is rotationally fixed by a hybrid output flange 59 to a gearing output shaft 61. This is connected in driving manner to the input end 13 of the axle differential 3. The output planetary gearing PG3 furthermore has a sun gear 65, meshing with its planet gears 55, being rotationally fixed to a sun gear shaft 67. Its shaft end away from the sun gear 65 can be coupled by the first hybrid shift element SH1 to the shifting shaft 53. The output planetary gearing PG3 furthermore has a ring gear 73, meshing with the planet gears 55 and fixed to the housing.

Furthermore, the planet carrier 49 of the intermediate planetary gearing PG2 is rotationally fixed across a connecting shaft 69 to the planet carrier 57 of the output planetary gearing PG3. The planet carrier 57 of the output planetary gearing PG3 furthermore has a hybrid output flange 61, which is rotationally fixed to the gearing output shaft 63.

In order to explain the functioning of the drive device, a driving situation will be described with the aid of FIG. 2, in which the first hybrid gear H1 is engaged. In this case, the first hybrid gear H1 is designed, for example, as a starting gear, which can be engaged at low driving speeds. When the first hybrid gear H1 is engaged, the planet carrier 39 des input planetary gearing PG1 is coupled in driving manner across the first hybrid shift element SH1 to the sun gear 65 of the output planetary gearing PG3. This forms a load path from the electric machine 26 to the input planetary gearing PG1, on whose planet carrier 39 a power branching occurs into a first partial path and a second partial path. The first partial path goes across the planet gears 37 and the ring gear 41 of the input planetary gearing PG1 to the ring gear shaft 45 and then to the intermediate planetary gearing PG2. From here, the first partial path goes across the connecting shaft 69 to the planet carrier 57 of the output planetary gearing PG3 and to the gearing output shaft 63. The second partial path goes from the planet carrier 39 of the input planetary gearing PG1 across the engaged hybrid shift element SH1 to the sun gear 65 of the output planetary gearing PG3. A power addition occurs on the planet carrier 57 of the output planetary gearing PG3, during which the first and second partial paths are combined.

Figure 2:
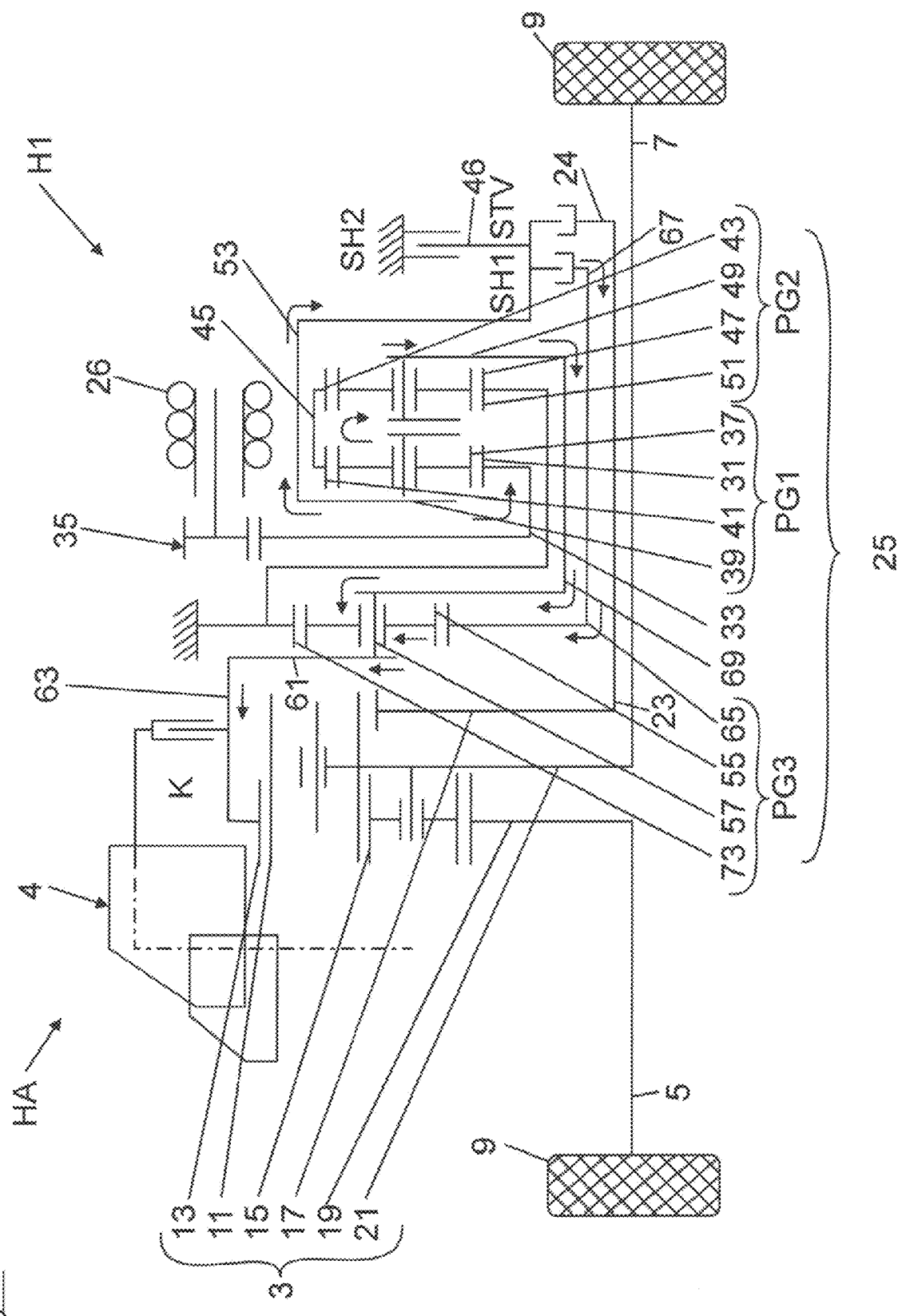
FIG. 2 respective view corresponding to FIG. 1 with highlighted drive torque flow with the first hybrid gear engaged.
Figure 3:
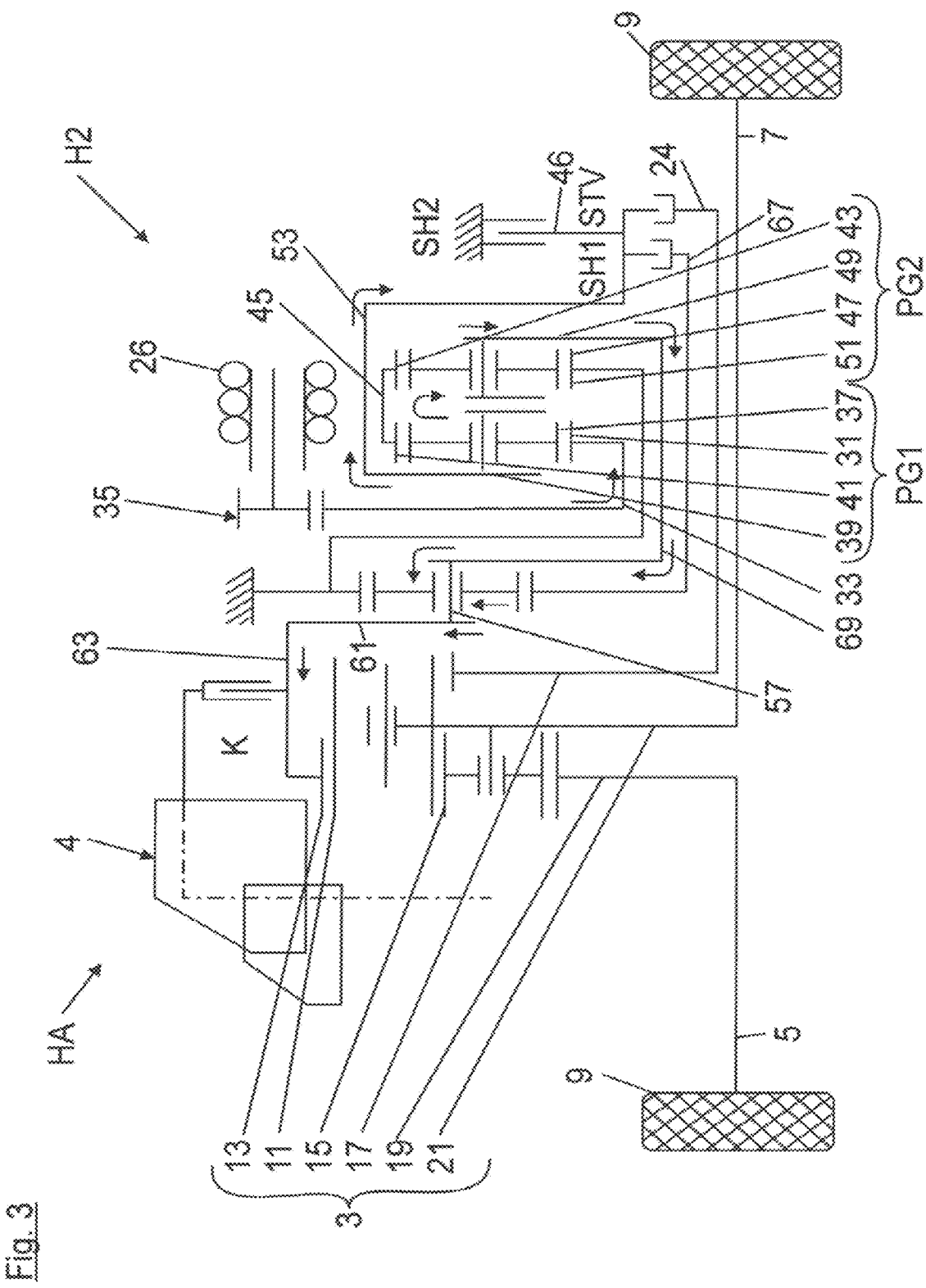
FIG. 3 respective view corresponding to FIG. 1 with highlighted drive torque flow with the second hybrid gear engaged.

FIG. 3 shows another driving situation, in which the superimposing gear 25 is operated with engaged second hybrid-Gear H2, by contrast with FIG. 2. In this case, the planet carrier 39 of the input planetary gearing PG1 is connected by means of the second hybrid shift element SH2 firmly to the housing. In this way, a load path is formed from the electric machine 26 across the input planetary gearing PG1 to the intermediate planetary gearing PG2 and then across the gearing output shaft 63 to the input end 13 of the axle differential 3.

Figure 4:
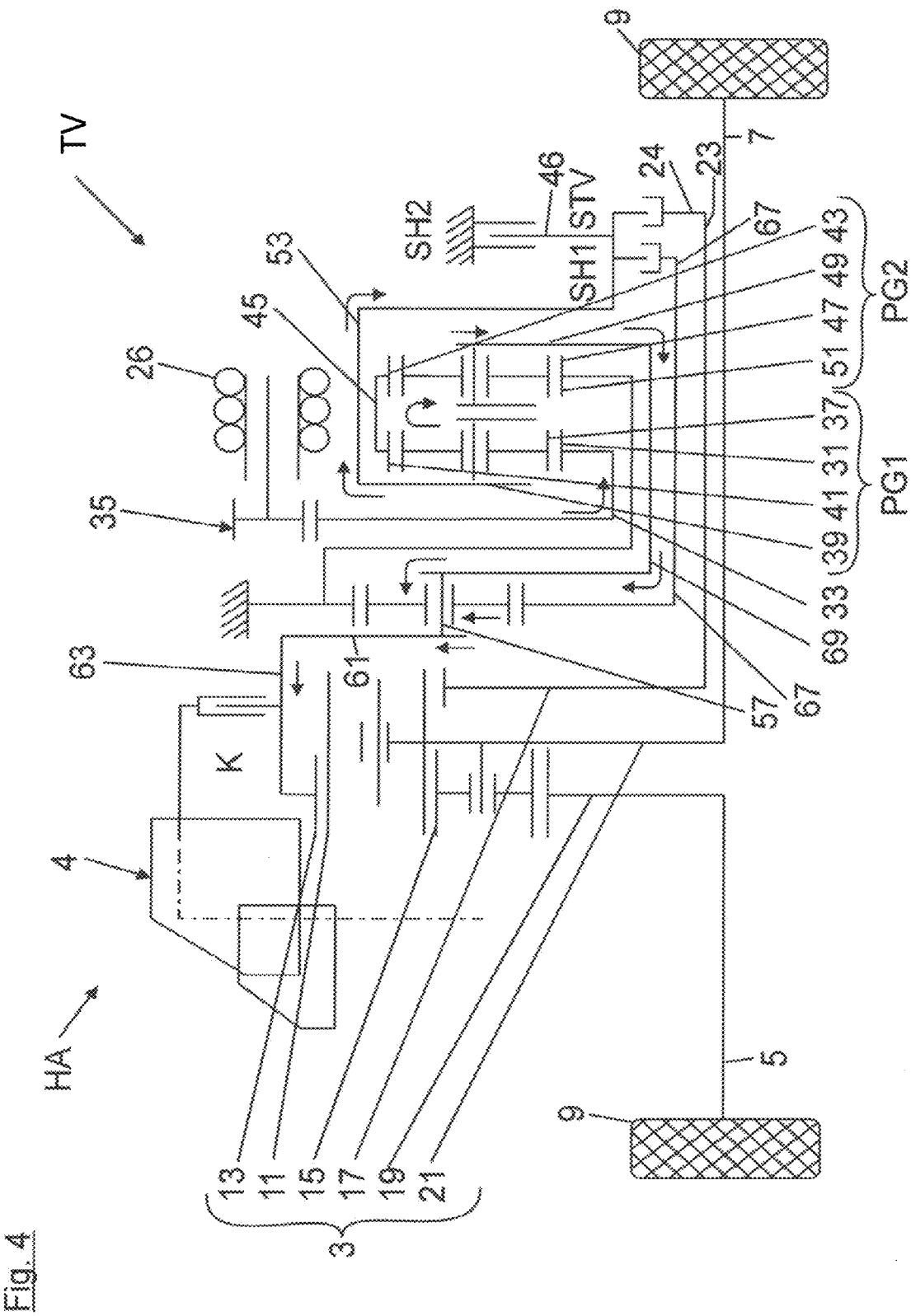
FIG. 4 respective views corresponding to FIG. 1 with highlighted drive torque flow with the torque distribution gear engaged.

In FIG. 4, the superimposing gear 25 is operated not in a hybrid mode, but instead in a torque distribution mode. This mode is activated, for example, when negotiating a curve, in order to accomplish a torque difference between the flange shafts 5, 7. In the torque distribution mode, the torque distribution gear TV is engaged, so that the torque distribution shaft 23 is connected in driving manner by means of the torque distribution shift element STV to the planet carrier 39 of the input planetary gearing PG1. In this way, a load path is produced from the electric machine 26 to the input planetary gearing PG1, on whose planet carrier 39 a power distribution occurs into a first partial path and a second partial path. The first partial path goes across the ring gear 41 of the input planetary gearing PG1 and across the ring gear shaft 45 to the intermediate planetary gearing PG2. From here, the first partial path proceeds across the planet carrier 49 of the intermediate planetary gearing PG2 to the gearing output shaft 63. In this case, both the input and intermediate planetary gearing PG1, PG2 are incorporated in the load path, while the output planetary gearing PG3 turns freely and is not incorporated in the load path. The second partial path goes across the planet carrier 39 of the input planetary gearing PG1 and across the engaged torque distribution shift element STV to the torque distribution shaft 23.

The invention claimed is:

1. A drive device for a vehicle axle of a two-track vehicle, wherein the vehicle axle comprises:
   an axle differential, which can be connected at the input end to a primary drive machine and can be connected at the output end across flange shafts arranged on either side to vehicle wheels of the vehicle axle, wherein the vehicle axle is associated with an additional drive machine and a shiftable superimposing gear, which can be shifted to a torque distribution mode in which a drive torque is generated by the additional drive machine, depending on the magnitude and direction of rotation of which a torque distribution on the two vehicle wheels can be changed, and shifted to at least one hybrid mode in which the drive torque generated by the additional drive machine can be coupled to both flange shafts of the vehicle wheels, evenly distributed across the axle differential,
   wherein the superimposing gear comprises exactly three planetary gearings coupled together: an input planetary gearing, an intermediate planetary gearing, and an output planetary gearing,
   wherein a load path is formed when a first hybrid mode is engaged in which a power branching occurs and all three of the three planetary gearings are incorporated,
   wherein, when a second hybrid mode is engaged and when the torque distribution mode is engaged, a load path is formed in the superimposing gear in which, of the three planetary gearings, only the input planetary gearing and the intermediate planetary gearing are incorporated.

2. The drive device according to claim 1, wherein the input planetary gearing is connected in driving manner to the additional drive machine, the output planetary gearing connected in driving manner to the axle differential, and the intermediate planetary gearing is connectively incorporated between the input planetary gearing and the output planetary gearing,
   wherein the three planetary gearings are arranged in succession coaxially to the flange shaft, and the input planetary gearing is rotationally fixed by its input element, a sun gear, to a gearing input shaft which is driven by the additional drive machine, and/or in that the output planetary gearing is rotationally fixed to a hybrid output flange by its output element, a planet carrier carrying planet gears, and is arranged on a gearing output shaft, which is connected in driving manner to the input end of the axle differential, and/or in that the output planetary gearing comprises a ring gear, meshing with the planet gears and fixed to the housing.

3. The drive device according to claim 2, wherein the sun gear of the input planetary gearing meshes with planet gears, which are rotatably mounted on a planet carrier and are in tooth engagement with a ring gear, and in that the ring gear of the input planetary gearing and a ring gear of the intermediate planetary gearing are rotationally fixed on a ring gear shaft, and in that the ring gear of the intermediate planetary gearing meshes with planet gears which are rotatably mounted on a planet carrier and which are in tooth engagement with a sun gear, fixed on the housing.

4. The drive device according to claim 3, wherein the planet carrier of the input planetary gearing can be locked by a hybrid shift element to the gearbox housing or be released from it, and in that a planet carrier of the intermediate planetary gearing is rotationally fixed on the planet carrier of the output planetary gearing or on the gearing output shaft, so that, in the second hybrid mode, the planet carrier of the input planetary gearing is connected by the hybrid shift element firmly to the housing, so that a load path is produced from the additional drive machine across the input planetary gearing to the intermediate planetary gearing and then across the gearing output shaft to the input end of the axle differential.

5. The drive device according to claim 4, wherein the planet carrier of the intermediate planetary gearing and the planet carrier of the output planetary gearing are connected in driving manner to each other by a connecting shaft.

6. The drive device according to claim 1, wherein the axle differential comprises:
   a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotationally fixed on the torque distribution output shaft, the second, minor sun gear is rotationally fixed on the one flange shaft and the common planet carrier is rotationally fixed on the other flange shaft.

7. The drive device according to claim 6, wherein the torque distribution shaft carries a rotationally fixed torque distribution output flange, by which a torque distribution shift element can be coupled in driving manner to the planet carrier of the input planetary gearing or be released from it.

8. The drive device according to claim 7, wherein, when the torque distribution mode is engaged, the torque distribution shaft and the planet carrier of the input planetary gearing are joined together in driving manner by the torque distribution shift element, so that a load path is produced from the additional drive machine to the input planetary gearing, on the planet carrier of which a power distribution occurs,
   during which a first partial path goes across the ring gear of the input planetary gearing and across the ring gear shaft to the intermediate planetary gearing, and from here the first partial path continues across its planet carrier to the gearing output shaft, the output planetary gearing turning freely and not being incorporated in the load path, and a second partial path continues across the planet carrier of the input planetary gearing and the engaged torque distribution shift element to the torque distribution shaft.

9. The drive device according to claim 2, wherein the output planetary gearing further comprises a sun gear, which meshes with its planet gears and can be coupled by a hybrid shift element to the planet carrier of the input planetary gearing or be released from it, and in that, when the first hybrid mode is engaged, the planet carrier of the input planetary gearing is coupled in driving manner to a sun gear of the output planetary gearing by the hybrid shift element, so that a load path is formed from the additional drive machine to the input planetary gearing, on the planet carrier of which a power branching occurs, during which a first partial path continues across the planet gears and the ring gear of the input planetary gearing to the ring gear shaft; and
   then to the intermediate planetary gearing, from which the first partial path continues across the connecting shaft to the planet carrier of the output planetary gearing and to the gearing output shaft, and a second partial path continues from the planet carrier of the input planetary gearing across the engaged hybrid shift element to the sun gear of the output planetary gearing, and a power addition occurs on the planet carrier of the output planetary gearing, during which the first and second partial paths are combined.

10. The drive device according to claim 2, wherein the planet carrier of the input planetary gearing is connected to a shifting shaft, which bounds off a radially inward design space, in which the input and the intermediate planetary gearing are arranged, and in that, particularly at a shaft end of the shifting shaft situated axially away from the input planet carrier, the first hybrid shift element, the second hybrid shift element and the torque distribution shift element are positioned thereon.

11. The drive device according to claim 10, wherein a sun gear of the output planetary gearing is arranged on a sun gear shaft, and a shaft end of the sun gear shaft away from the sun gear can be coupled by the first hybrid shift element to the shifting shaft.

12. The drive device according to claim 1, wherein the output planetary gearing is situated vehicle-inward in the vehicle transverse direction and immediately next to the axle differential, and the intermediate planetary gearing is situated vehicle-outward, and in that the shift elements are positioned on the vehicle-outward side of the intermediate planetary gearing.

13. The drive device according to claim 2, wherein the axle differential comprises:
a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotationally fixed on the torque distribution output shaft, the second, minor sun gear is rotationally fixed on the one flange shaft and the common planet carrier is rotationally fixed on the other flange shaft.

14. The drive device according to claim 3, wherein the axle differential comprises:
a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotationally fixed on the torque distribution output shaft, the second, minor sun gear is rotationally fixed on the one flange shaft and the common planet carrier is rotationally fixed on the other flange shaft.

15. The drive device according to claim 4, wherein the axle differential comprises:
a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotationally fixed on the torque distribution output shaft, the second, minor sun gear is rotationally fixed on the one flange shaft and the common planet carrier is rotationally fixed on the other flange shaft.

16. The drive device according to claim 5, wherein the axle differential comprises:
a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotationally fixed on the torque distribution output shaft, the second, minor sun gear is rotationally fixed on the one flange shaft and the common planet carrier is rotationally fixed on the other flange shaft.

17. The drive device according to claim 3, wherein the output planetary gearing further comprises a sun gear, which meshes with its planet gears and can be coupled by a hybrid shift element to the planet carrier of the input planetary gearing or be released from it, and in that, when the first hybrid mode is engaged, the planet carrier of the input planetary gearing is coupled in driving manner to a sun gear of the output planetary gearing by the hybrid shift element, so that a load path is formed from the additional drive machine to the input planetary gearing, on the planet carrier of which a power branching occurs, during which a first partial path continues across the planet gears and the ring gear of the input planetary gearing to the ring gear shaft; and
then to the intermediate planetary gearing, from which the first partial path continues across the connecting shaft to the planet carrier of the output planetary gearing and to the gearing output shaft, and a second partial path continues from the planet carrier of the input planetary gearing across the engaged hybrid shift element to the sun gear of the output planetary gearing, and a power addition occurs on the planet carrier of the output planetary gearing, during which the first and second partial paths are combined.

18. The drive device according to claim 4, wherein the output planetary gearing further comprises a sun gear, which meshes with its planet gears and can be coupled by a hybrid shift element to the planet carrier of the input planetary gearing or be released from it, and in that, when the first hybrid mode is engaged, the planet carrier of the input planetary gearing is coupled in driving manner to a sun gear of the output planetary gearing by the hybrid shift element, so that a load path is formed from the additional drive machine to the input planetary gearing, on the planet carrier of which a power branching occurs, during which a first partial path continues across the planet gears and the ring gear of the input planetary gearing to the ring gear shaft; and
then to the intermediate planetary gearing, from which the first partial path continues across the connecting shaft to the planet carrier of the output planetary gearing and to the gearing output shaft, and a second partial path continues from the planet carrier of the input planetary gearing across the engaged hybrid shift element to the sun gear of the output planetary gearing, and a power addition occurs on the planet carrier of the output planetary gearing, during which the first and second partial paths are combined.

19. The drive device according to claim 5, wherein the output planetary gearing further comprises a sun gear, which meshes with its planet gears and can be coupled by a hybrid shift element to the planet carrier of the input planetary gearing or be released from it, and in that, when the first hybrid mode is engaged, the planet carrier of the input planetary gearing is coupled in driving manner to a sun gear of the output planetary gearing by the hybrid shift element, so that a load path is formed from the additional drive machine to the input planetary gearing, on the planet carrier of which a power branching occurs, during which a first partial path continues across the planet gears and the ring gear of the input planetary gearing to the ring gear shaft; and then to the intermediate planetary gearing, from which the first partial path continues across the connecting shaft to the planet carrier of the output planetary gearing and to the gearing output shaft, and a second partial path continues from the planet carrier of the input planetary gearing across the engaged hybrid shift element to the sun gear of the output planetary gearing, and a power addition occurs on the planet carrier of the output planetary gearing, during which the first and second partial paths are combined.

20. The drive device according to claim 6, wherein the output planetary gearing further comprises a sun gear, which meshes with its planet gears and can be coupled by a hybrid shift element to the planet carrier of the input planetary gearing or be released from it, and in that, when the first hybrid mode is engaged, the planet carrier of the input planetary gearing is coupled in driving manner to a sun gear of the output planetary gearing by the hybrid shift element, so that a load path is formed from the additional drive machine to the input planetary gearing, on the planet carrier of which a power branching occurs, during which a first partial path continues across the planet gears and the ring gear of the input planetary gearing to the ring gear shaft; and then to the intermediate planetary gearing, from which the first partial path continues across the connecting shaft to the planet carrier of the output planetary gearing and to the gearing output shaft, and a second partial path continues from the planet carrier of the input planetary gearing across the engaged hybrid shift element to the sun gear of the output planetary gearing, and a power addition occurs on the planet carrier of the output planetary gearing, during which the first and second partial paths are combined.

\* \* \* \* \*